(12) United States Patent
Sugizaki et al.

(10) Patent No.: US 9,285,269 B2
(45) Date of Patent: Mar. 15, 2016

(54) LIGHT RECEIVING CIRCUIT

(71) Applicant: KABUSHIKI KAISHA TOSHIBA, Tokyo (JP)

(72) Inventors: Masayuki Sugizaki, Kanagawa (JP); Shigeyuki Sakura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 14/175,702

(22) Filed: Feb. 7, 2014

(65) Prior Publication Data
US 2015/0001380 A1 Jan. 1, 2015

(30) Foreign Application Priority Data

Jul. 1, 2013 (JP) ................................ 2013-138259

(51) Int. Cl.
*G01J 1/46* (2006.01)
(52) U.S. Cl.
CPC ......................................... *G01J 1/46* (2013.01)

(58) Field of Classification Search
CPC ........................................................ G01J 1/46
See application file for complete search history.

(56) References Cited

FOREIGN PATENT DOCUMENTS

| JP | H06315011 A | 11/1994 |
|---|---|---|
| JP | H10284783 A | 10/1998 |
| JP | 2003101356 A | 4/2003 |
| JP | 2007005901 A | 1/2007 |

*Primary Examiner* — Renee D Chavez
(74) *Attorney, Agent, or Firm* — Patterson & Sheridan, LLP

(57) ABSTRACT

A light receiving circuit includes first, second, and third resistors, a photodiode that is connected in series with the first resistor between first and second potential lines, and a first MOS transistor of a first conductivity type having a source connected to a second node, a drain connected to an output, and a gate connected to a first node that is between the first resistor and the photodiode. The light receiving circuit also includes a capacitor which is connected in parallel to the second resistor between the first potential line and the second node. The third resistor is connected between the output and the second potential line.

20 Claims, 6 Drawing Sheets

200

300

LIGHT RECEIVING CIRCUIT

CROSS-REFERENCE TO RELATED APPLICATION

This application is based upon and claims the benefit of priority from Japanese Patent Application No. 2013-138259, filed Jul. 1, 2013, the entire contents of which are incorporated herein by reference.

FIELD

Embodiments described herein relate generally to a light receiving circuit.

BACKGROUND

Recently, a light receiving circuit which includes a photodiode and a comparator formed of a CMOS circuit has been developed. In such a light receiving circuit, when the value of optical input power changes, the amount of time that elapses until an output of the comparator is switched also changes. Accordingly, the distortion of a pulse width (PWD: pulse width distortion) of an output signal occurs.

DETAILED DESCRIPTION

Embodiments provide a light receiving circuit which can reduce the pulse width distortion of an output signal.

In general, according to one embodiment, a light receiving circuit includes a first resistor having a first end connected to a first potential line and a second end connected to a first node, a photodiode having a first end connected to the first node and a second end connected to a second potential line, and configured to convert an optical signal into an electrical signal, a second resistor having a first end connected to the first potential line and a second end connected to a second node, a first MOS transistor of a first conductivity type having a source connected to the second node, a drain connected to an output, and a gate connected to the first node, a third resistor having a first end connected to the output and a second end connected to the second potential line, and a capacitor connected in parallel to the second resistor between the first potential line and the second node.

Hereinafter, embodiments are explained in conjunction with drawings.

First Embodiment

Figure 1:
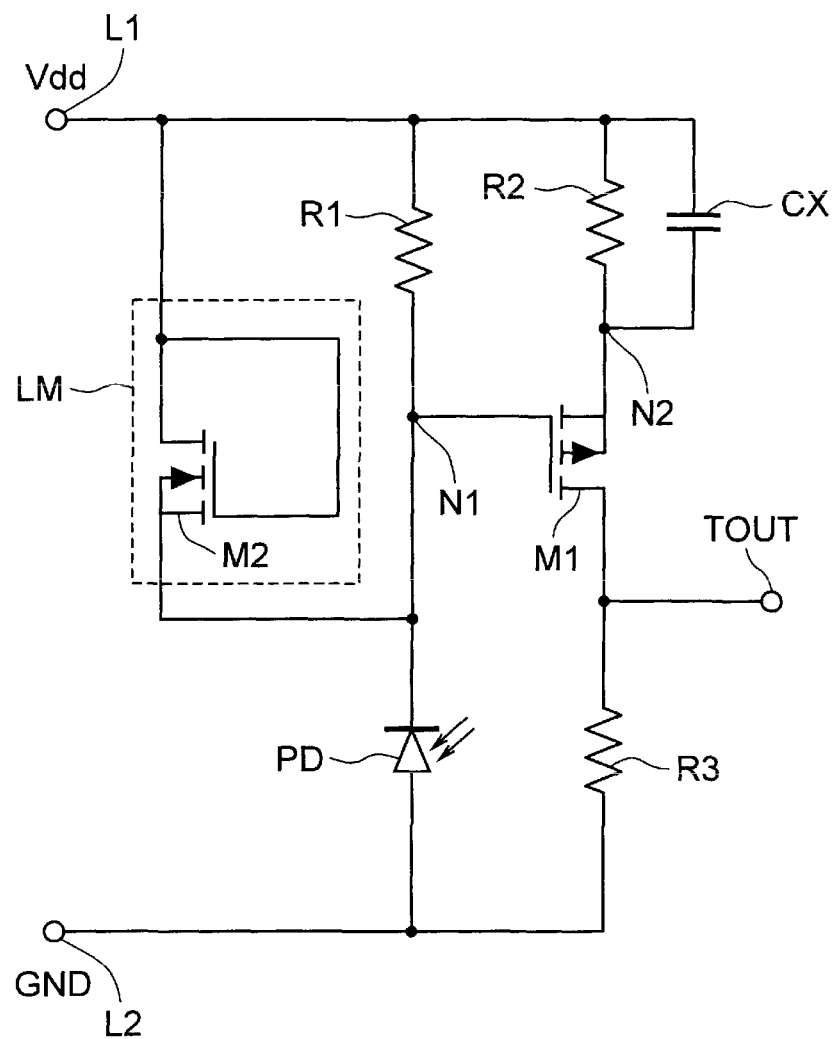
FIG. 1 is a circuit diagram showing one example of the configuration of a light receiving circuit of a first embodiment.

FIG. 1 is a circuit diagram showing one example of the configuration of a light receiving circuit 100 of a first embodiment.

As shown in FIG. 1, the light receiving circuit 100 includes: a first resistor R1; a second resistor R2; a third resistor R3; a photodiode PD; a first MOS transistor of a first conductive type (pMOS transistor) M1; and a limiter circuit LM. A pMOS transistor corresponds to a p-channel metal-oxide-semiconductor transistor.

The first resistor R1 has one end thereof connected to a first potential line L1, and the other end thereof connected to a node N1. In this embodiment, a power source voltage Vdd is applied to the first potential line L1.

The photodiode PD has one end (cathode) thereof connected to the node N1, and the other end (anode) thereof connected to the second potential line L2. In this embodiment, a ground voltage GND is applied to the second potential line L2.

The photodiode PD converts an optical signal incident on the photodiode PD from an optical fiber or another circuit (device) into an electrical signal by photoelectric conversion, for example. That is, the photodiode PD allows an input current having a value corresponding to power of an optical signal to flow therethrough. For example, when the power of the optical signal is increased, the photodiode PD increases the input current, and when the power of the optical signal is decreased, the photodiode PD decreases the input current.

The second resistor R2 has one end thereof connected to the first potential line L1, and the other end thereof connected to a node N2.

The first MOS transistor M1 has a source thereof connected to the node N2, a drain thereof connected to the output terminal TOUT, and a gate thereof connected to the node N1.

The third resistor R3 has one end thereof connected to an output terminal TOUT, and the other end thereof connected to a second potential line L2.

The first resistor R1, the second resistor R2, and the third resistor R3 are formed of, for example, a resistor or a depletion type MOS transistor respectively.

The limiter circuit LM is connected in parallel to the first resistor R1 between the first potential line L1 and the node N1. The limiter circuit LM allows an electric current to flow between the first potential line L1 and the node N1 when an electric current which flows through the first resistor R1 becomes a predetermined reference value or more.

The limiter circuit LM includes a second MOS transistor (nMOS transistor) M2 of a second conductive type, for example. A nMOS transistor corresponds to n-channel metal-oxide-semiconductor transistor.

The second MOS transistor M2 is diode-connected and has a drain connected to the first potential line L1 and a source connected to the node N1.

An absolute value of a threshold voltage of the second MOS transistor M2 is set larger than an absolute value of a threshold voltage of the first MOS transistor M1.

In the light receiving circuit 100 having the above-mentioned constitution, for example, when an optical signal is incident on the photodiode PD, a current signal flows through the photodiode PD so that a voltage signal is generated at both ends of the first resistor R1.

When a voltage value of the voltage signal exceeds an absolute value of a threshold voltage of the first MOS transistor M1, an electric current flows from a drain of the first MOS transistor M1. Accordingly, a voltage is generated at both ends of the third resistor R3 so that a signal is outputted from the output terminal TOUT.

As described previously, an absolute value of a threshold voltage of the second MOS transistor M2 is set larger than an absolute value of a threshold voltage of the first MOS transistor M1.

Due to such voltage setting, when the first MOS transistor M1 is turned on, and thereafter, a larger optical signal is incident on the photodiode PD, the second MOS transistor M2 bypasses an electric current outputted from the photodiode PD. In this manner, the second MOS transistor M2 is operated as a limiter which prevents a gate-source voltage Vgs of the first MOS transistor M1 from becoming excessively large.

In the light receiving circuit 100, the second resistor R2 and the capacitor CX are connected in parallel to each other between the first potential line L1 and the node N2.

Due to such a configuration, when an optical signal inputted to the photodiode PD is turned on (when the power of the optical signal is increased to a predetermined level), an electric current which flows through the photodiode PD is rapidly increased. Accordingly, the first MOS transistor M1 is turned on so that an electric current flows through the capacitor CX whereby a source of the first MOS transistor M1 is short-circuited to the first potential line L1 (power source voltage Vdd) through the capacitor CX. That is, the influence of capacity of the capacitor CX exerted on the sensitivity of the light receiving circuit 100 can be suppressed.

On the other hand, a fixed electric current flows through the limiter circuit before the optical signal is turned off (the power of the optical signal is lowered to an original level) and hence, a voltage at both ends of the capacitor CX is fixed whereby the charging of the capacitor CX is completed. Accordingly, a source potential of the first MOS transistor M1 is lowered below a power source voltage Vdd. That is, a gate-source voltage Vgs of the first MOS transistor M1 is sufficiently lowered immediately before the optical signal falls.

When the optical signal is turned off, the gate-source voltage Vgs is sufficiently low so that the first MOS transistor M1 can be cut off more rapidly.

Accordingly, a switching time of the transistor M1 at the time of falling of an optical signal can be shortened. That is, the light receiving circuit 100 can reduce pulse width distortion of an output signal.

Hereinafter, a result of simulation carried out on operational characteristics of the light receiving circuit 100 having the above-mentioned configuration and functions is explained.

Figure 2:
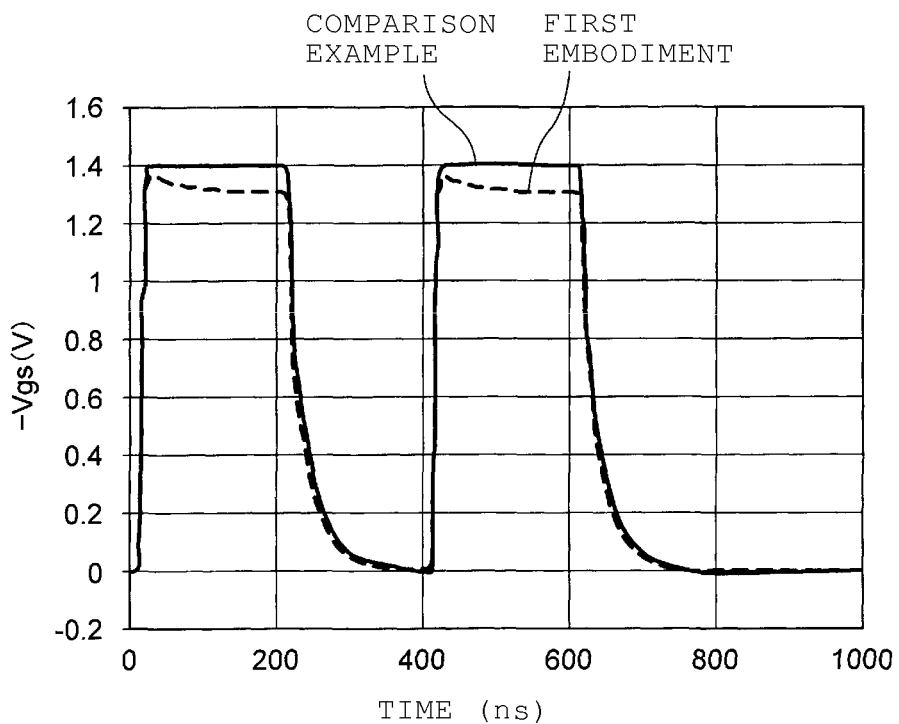
FIG. 2 is a waveform chart showing a waveform of transient response of a gate-source voltage of a first MOS transistor when a rectangular wave is inputted to a photodiode.
Figure 3:
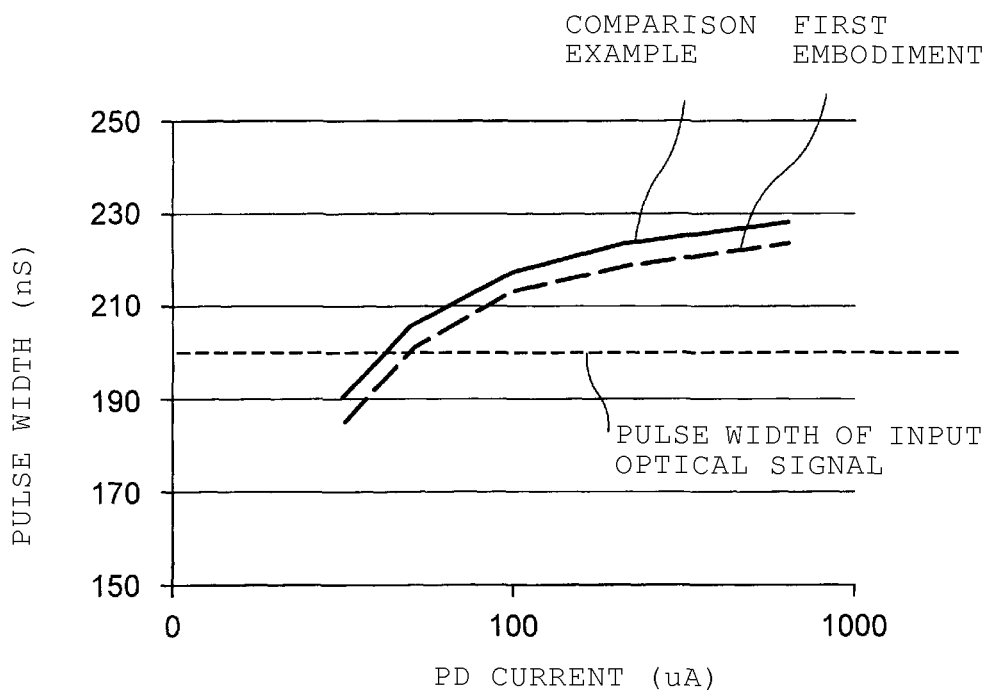
FIG. 3 is a characteristic graph showing the relationship between a pulse width of an output signal outputted from a CMOS buffer connected to an output terminal and an electric current of the photodiode.

FIG. 2 is a waveform chart showing a waveform of a transient response of the gate-source voltage Vgs of the first MOS transistor M1 when a rectangular wave is inputted to the photodiode PD. FIG. 3 is a characteristic graph showing the relationship between a pulse width of an output signal outputted from a CMOS buffer connected to the output terminal TOUT and an electric current of the photodiode PD. In FIG. 2 and FIG. 3, a corresponding waveform and a corresponding relationship when the light receiving circuit 100 is provided with neither the second resistor R2 nor the capacitor CX are shown as a comparison example.

As shown in FIG. 2, compared to the waveform of the comparison example, in the waveform of the first embodiment, the fall of the gate-source voltage Vgs is steep and amplitude of the gate-source voltage Vgs can be suppressed. As shown in FIG. 3, compared to the characteristics of the comparison example, in the first embodiment, the separation of a pulse width of an output signal from a pulse width of an input optical signal is small so that pulse width distortion can be reduced.

As described above, according to the light receiving circuit of this embodiment, the pulse width distortion of an output signal can be reduced.

Second Embodiment

Figure 4:
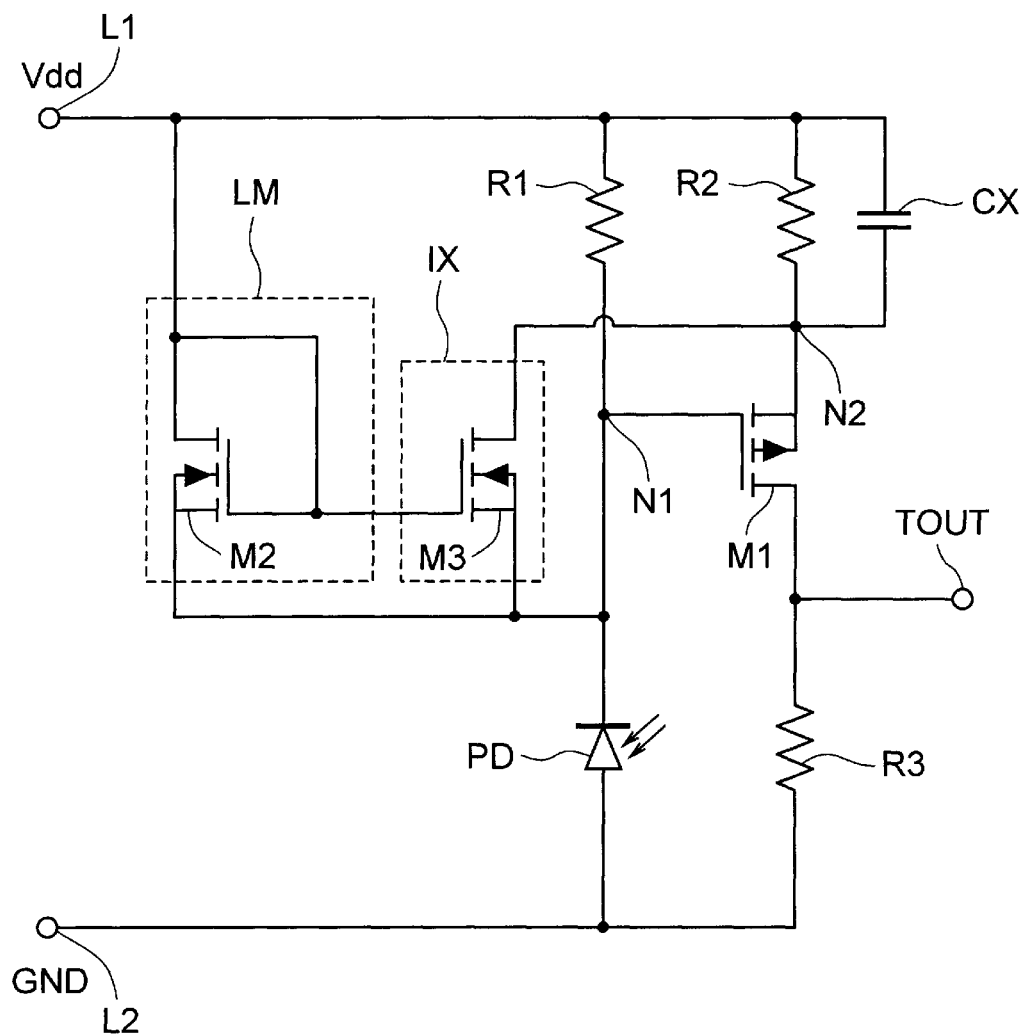
FIG. 4 is a circuit diagram showing one example of the configuration of a light receiving circuit of a second embodiment.

FIG. 4 is a circuit diagram showing one example of the configuration of a light receiving circuit 200 of a second embodiment. In FIG. 4, symbols identical with symbols in FIG. 1 indicate elements that are substantially the same as the corresponding elements of the first embodiment.

As shown in FIG. 4, the light receiving circuit 200 includes: a first resistor R1; a second resistor R2; a third resistor R3; a photodiode PD; a first MOS transistor (pMOS transistor) M1 of a first conductive type; a limiter circuit LM; and a current extraction circuit IX.

That is, compared to the light receiving circuit 100 of the first embodiment, the light receiving circuit 200 of the second embodiment further includes the current extraction circuit IX.

The current extraction circuit IX is connected between a node N1 and a node N2, and allows an electric current corresponding to an electric current which flows through the limiter circuit LM to flow between the node N1 and the node N2.

In this embodiment, the limiter circuit LM includes, for example, a second MOS transistor (nMOS transistor) M2 of a second conductive type.

The second MOS transistor M2 is diode-connected and has a drain connected to the first potential line L1 and a source connected to the node N1.

The current extraction circuit IX includes a third MOS transistor (nMOS transistor) M3 of a second conductive type.

The third MOS transistor M3 has a drain thereof connected to the node N2, a source thereof connected to the node N1, and a gate thereof connected to a gate of the second MOS transistor M2.

That is, these second MOS transistor M2 and third MOS transistor M3 constitute a current mirror circuit.

Accordingly, the current extraction circuit IX (third MOS transistor M3) allows an electric current corresponding to an electric current which flows through the limiter circuit LM (second MOS transistor M2) (mirror current) to flow between the node N1 and the node N2.

In the same manner as the first embodiment, an absolute value of a threshold voltage of the second MOS transistor M2 is set larger than an absolute value of a threshold voltage of the first MOS transistor M1. Due to such voltage setting, an electric current does not flow through the third MOS transistor M3 until the limiter circuit LM is operated (an electric current flows through the second MOS transistor M2).

When an optical signal at a level where the limiter circuit LM is operated is inputted to the photodiode PD, an electric current flows through the third MOS transistor M3 so that a source potential of the first MOS transistor M1 is lowered.

Due to such a configuration, it is possible to prevent a gate-source voltage Vgs of the first MOS transistor M1 from becoming excessively large so that the first MOS transistor M1 can be turned off more rapidly when an optical signal is turned off.

Accordingly, a switching time of the first MOS transistor M1 when an optical signal falls can be shortened so that the pulse width distortion can be reduced.

Other configurations and functions of the light receiving circuit 200 are substantially equal to the corresponding configurations and functions of the light receiving circuit 100 of the first embodiment.

Hereinafter, a result of simulation carried out on operational characteristics of the light receiving circuit 200 having the above-mentioned configuration and functions is explained.

Figure 5:
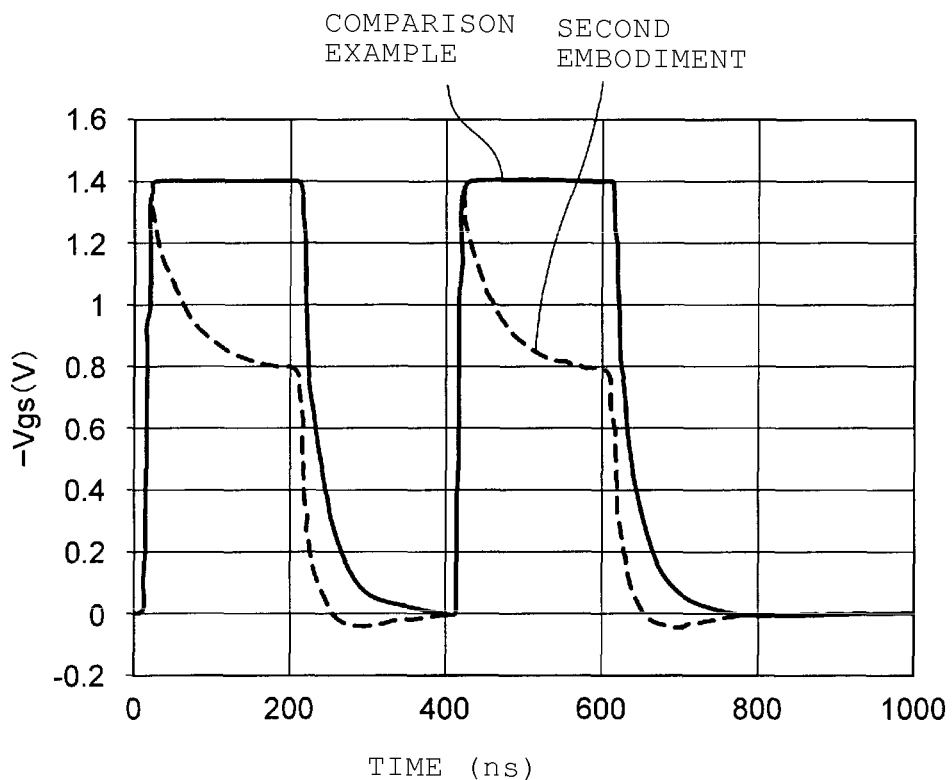
FIG. 5 is a waveform chart showing a waveform of transient response of a gate-source voltage of a first MOS transistor when a rectangular wave is inputted to a photodiode.
Figure 6:
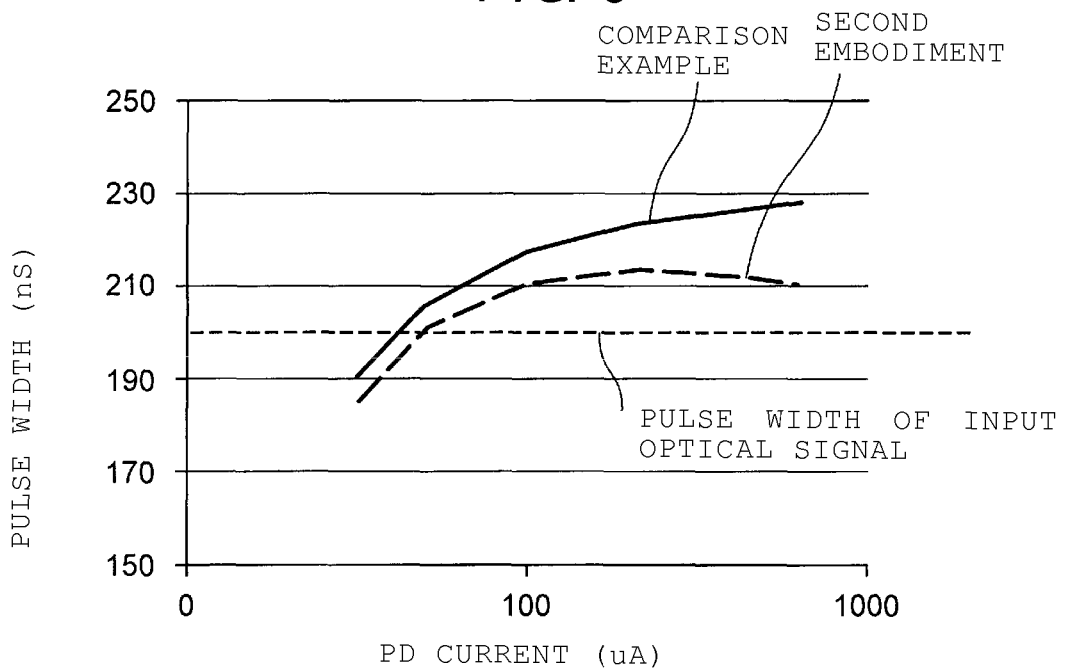
FIG. 6 is a characteristic graph showing the relationship between a pulse width of an output signal outputted from a CMOS buffer connected to an output terminal and an electric current of the photodiode.

FIG. 5 is a waveform chart showing a waveform of a transient response of the gate-source voltage Vgs of the first MOS transistor M1 when a rectangular wave is inputted to the photodiode PD. FIG. 6 is a characteristic graph showing the relationship between a pulse width of an output signal outputted from a CMOS buffer connected to an output terminal TOUT and an electric current of the photodiode PD. In FIG. 5 and FIG. 6, in the same manner as FIG. 2 and FIG. 3, a corresponding waveform and a corresponding relationship when the light receiving circuit 200 is provided with neither the second resistor R2 nor the capacitor CX are shown as a comparison example.

As shown in FIG. 5, compared to the waveform of the comparison example, in the waveform of the second embodiment, the fall of the gate-source voltage Vgs is steeper and amplitude of the gate-source voltage Vgs can be also suppressed. With respect to the characteristic of the second embodiment shown in FIG. 5, due to the operation of the current extraction circuit IX, the fall of the gate-source voltage Vgs becomes steeper than the fall of the gate-source voltage Vgs in the characteristic of the first embodiment shown in FIG. 2.

As shown in FIG. 6, compared to the characteristics of the comparison example, in the second embodiment, the separation of a pulse width of an output signal from a pulse width of an input optical signal is small so that pulse width distortion can be reduced.

As described above, according to the light receiving circuit of this embodiment, the pulse width distortion of an output signal can be further reduced.

Third Embodiment

In the second embodiment described above, the explanation is made with respect to one example of the configuration where the limiter circuit is an nMOS transistor.

In a third embodiment, the explanation is made with respect to one example of the configuration where the limiter circuit is a pMOS transistor.

Figure 7:
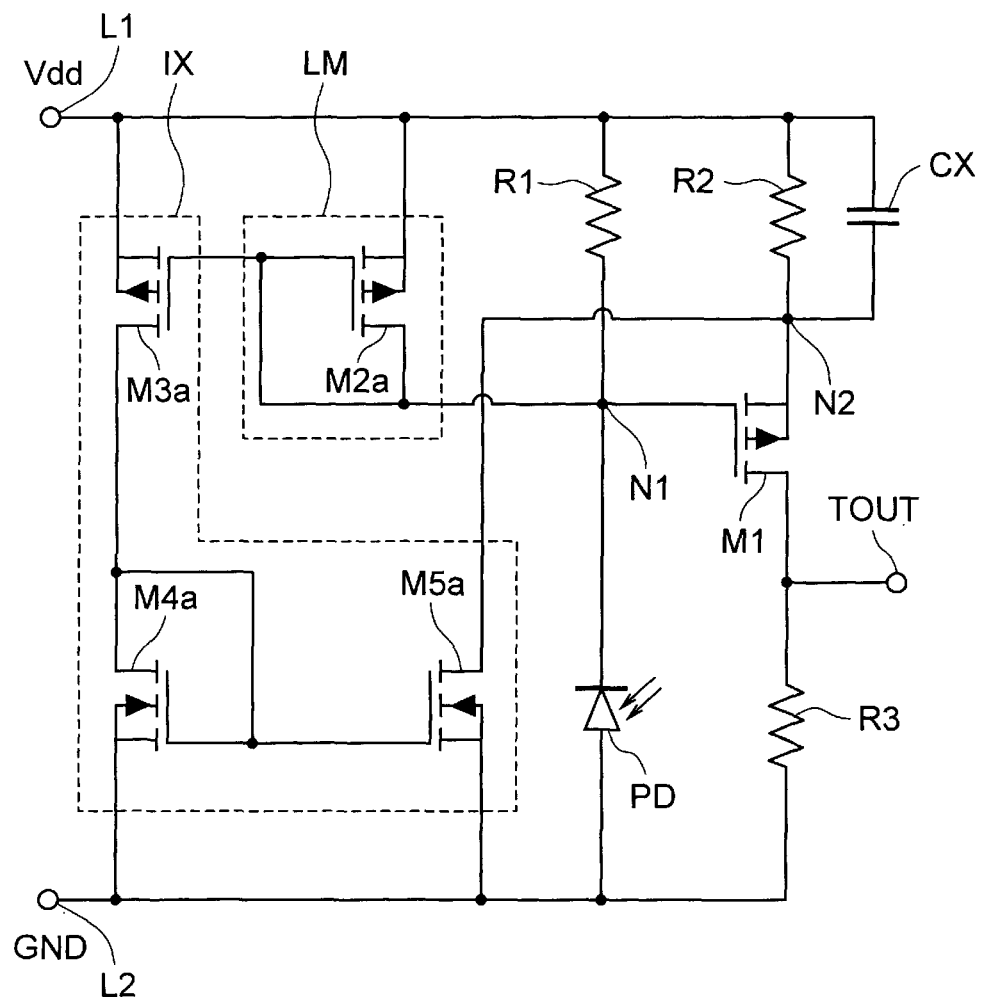
FIG. 7 is a circuit diagram showing one example of the configuration of a light receiving circuit of a third embodiment.

FIG. 7 is a circuit diagram showing one example of the configuration of a light receiving circuit 300 of the third embodiment. In FIG. 7, symbols identical with symbols in FIG. 1 indicate elements that are substantially same as the corresponding elements of the first embodiment.

As shown in FIG. 7, the light receiving circuit 300 includes: a first resistor R1; a second resistor R2; a third resistor R3; a photodiode PD; a first MOS transistor (pMOS transistor) M1 of a first conductive type; a limiter circuit LM; and a current extraction circuit IX.

In this embodiment, the limiter circuit LM includes a second MOS transistor (pMOS transistor) M2a of a first conductive type.

The second MOS transistor M2a is diode-connected and has a source connected to a first potential line L1 and a drain connected to a node N1.

An absolute value of a threshold voltage of the second MOS transistor M2a is set larger than an absolute value of a threshold voltage of the first MOS transistor M1.

In this embodiment, the current extraction circuit IX includes: a third MOS transistor (pMOS transistor) M3a of a first conductive type; a fourth MOS transistor (nMOS transistor) M4a of a second conductive type; and a fifth MOS transistor (nMOS transistor) M5a of a second conductive type.

The third MOS transistor M3a has a source thereof connected to the first potential line L1, and a gate thereof connected to a gate of the second MOS transistor M2a.

The fourth MOS transistor M4a is diode-connected and has a drain connected to the drain of the third MOS transistor M3a, and a source connected to the second potential line L2.

The fifth MOS transistor M5a has a drain thereof connected to a node N2, a source thereof connected to the second potential line L2, and a gate thereof connected to a gate of the fourth MOS transistor M4a.

The second MOS transistor M2a and the third MOS transistor M3a constitute a current mirror circuit. The fourth MOS transistor M4a and the fifth MOS transistor M5a also constitute a current mirror circuit.

Accordingly, the current extraction circuit IX (third to fifth MOS transistors M3a to M5a) allows an electric current (mirror current) corresponding to an electric current which flows through the limiter circuit LM (second MOS transistor M2a) to flow between the node N1 and the second potential line L2.

In the same manner as the first embodiment, an absolute value of a threshold voltage of the second MOS transistor M2a is set larger than an absolute value of a threshold voltage of the first MOS transistor M1. Due to such voltage setting, an electric current does not flow through the third MOS transistor M3a until the limiter circuit LM is operated (an electric current flows through the second MOS transistor M2a).

When an optical signal at a level where the limiter circuit LM is operated is inputted to the photodiode PD, an electric current flows through the third to fifth MOS transistors M3a to M5a so that a source potential of the first MOS transistor M1 is lowered.

Due to such an operation, it is possible to prevent a gate-source voltage Vgs of the first MOS transistor M1 from becoming excessively large so that the first MOS transistor M1 can be turned off more rapidly when the optical signal is turned off.

Accordingly, a switching time of the first MOS transistor M1 when an optical signal is turned off can be shortened so that pulse width distortion can be reduced.

Other configurations and functions of the light receiving circuit 300 are substantially equal to the corresponding configurations and functions of the light receiving circuit 200 of the second embodiment.

That is, according to the light receiving circuit of this embodiment, the pulse width distortion of an output signal can be reduced.

Fourth Embodiment

The light receiving circuits of the first to third embodiments described above can achieve substantially the same operational effects even when the polarities of the light receiving circuits are reversed.

In the fourth embodiment, as one example, the explanation is made with respect to an example of the configuration where the polarities of the light receiving circuit of the second embodiment are reversed.

Figure 8:
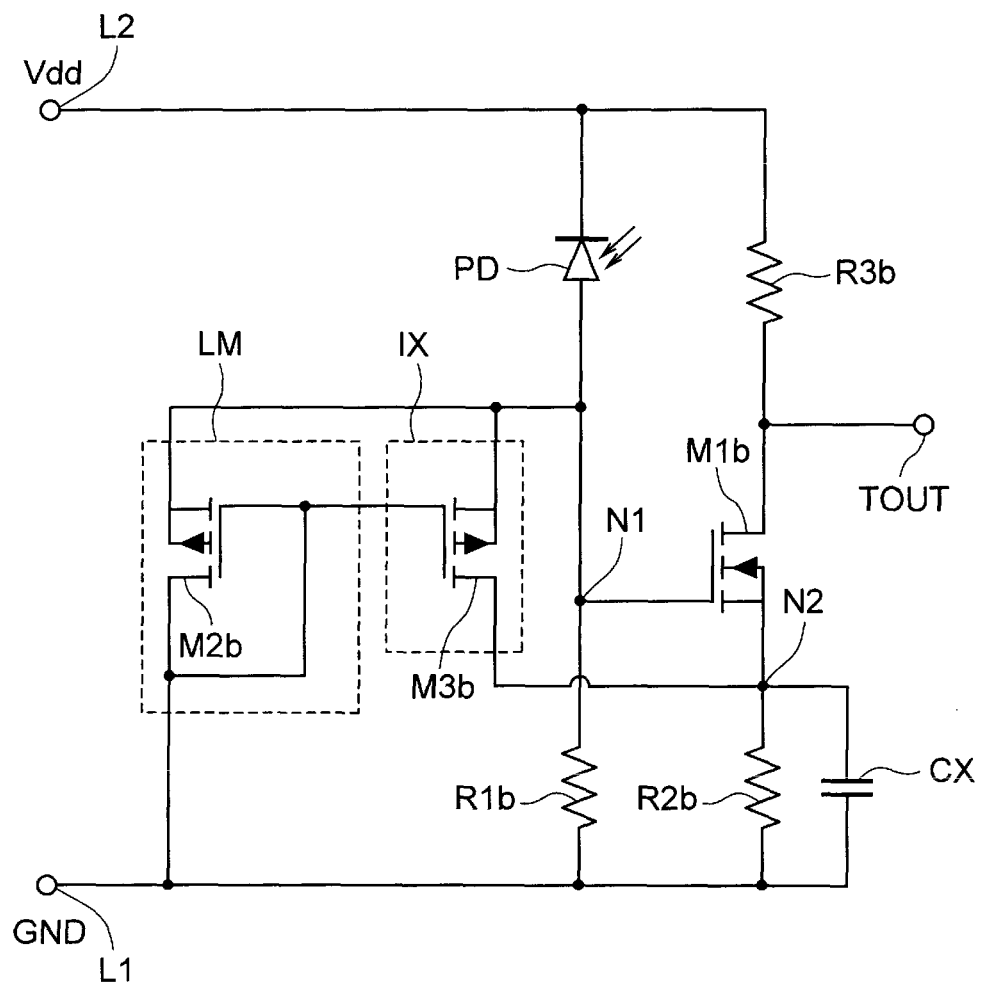
FIG. 8 is a circuit diagram showing one example of the configuration of a light receiving circuit of a fourth embodiment.

FIG. 8 is a circuit diagram showing one example of the configuration of a light receiving circuit 400 of the fourth embodiment. In FIG. 8, symbols identical with symbols in FIG. 5 indicate elements that are substantially the same as the corresponding elements of the second embodiment.

As shown in FIG. 8, the light receiving circuit 400 includes: a first resistor R1b; a second resistor R2b; a third resistor R3b; a photodiode PD; a first MOS transistor (nMOS transistor) M1b of a first conductive type; a limiter circuit LM; and a current extraction circuit IX.

In this embodiment, a ground voltage is applied to a first potential line L1. A power source voltage is applied to a second potential line L2.

As described previously, the first MOS transistor M1b is an nMOS transistor.

The photodiode PD has a cathode thereof connected to the second potential line L2, and an anode thereof connected to the node N1.

In this embodiment, the limiter circuit LM includes a second MOS transistor (pMOS transistor) M2b of a second conductive type.

The second MOS transistor M2b is diode-connected and has a source connected to the first potential line L1 and a drain connected to the node N1.

An absolute value of a threshold voltage of the second MOS transistor M2b is set larger than an absolute value of a threshold voltage of the first MOS transistor M1b.

In this embodiment, the current extraction circuit IX includes a third MOS transistor (pMOS transistor) M3b of a second conductive type.

The third MOS transistor M3b has a drain thereof connected to a node N2, a source thereof connected to the node N1, a gate thereof connected to a gate of the second MOS transistor M2b.

That is, these second MOS transistor M2b and third MOS transistor M3b constitute a current mirror circuit.

Accordingly, the current extraction circuit IX (third MOS transistor M3b) allows an electric current (mirror current) corresponding to an electric current which flows through the limiter circuit LM (second MOS transistor M2b) to flow between the node N1 and the node N2.

In the same manner as the first embodiment, an absolute value of a threshold voltage of the second MOS transistor M2b is set larger than an absolute value of a threshold voltage of the first MOS transistor M1b. Due to such voltage setting, an electric current does not flow through the third MOS transistor M3b until the limiter circuit LM is operated (an electric current flows through the second MOS transistor M2b).

When an optical signal at a level where the limiter circuit LM is operated is inputted to the photodiode PD, an electric current flows through the third MOS transistor M3b so that a source potential of the first MOS transistor M1b is increased.

Due to such an operation, it is possible to prevent a gate-source voltage Vgs of the first MOS transistor M1b from becoming excessively large so that the first MOS transistor M1b can be turned off more rapidly when the optical signal is turned off.

Accordingly, a switching time of the first MOS transistor M1b when an optical signal falls can be shortened so that the pulse width distortion can be reduced.

Other configurations and functions of the light receiving circuit 400 are substantially equal to the corresponding configurations and functions of the light receiving circuit 200 of the second embodiment.

That is, according to the light receiving circuit of this embodiment, the pulse width distortion of an output signal can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light receiving circuit comprising:
    a first resistor having a first end connected to a first potential line and a second end connected to a first node;
    a photodiode having a first end connected to the first node and a second end connected to a second potential line, and configured to convert an optical signal into an electrical signal;
    a second resistor having a first end connected to the first potential line and a second end connected to a second node;
    a first MOS transistor of a first conductivity type having a source connected to the second node, a drain connected to an output, and a gate connected to the first node;
    a third resistor having a first end connected to the output and a second end connected to the second potential line; and
    a capacitor connected in parallel to the second resistor between the first potential line and the second node.

2. The light receiving circuit according to claim 1, further comprising:
    a limiter circuit connected in parallel to the first resistor between the first potential line and the first node, and configured to allow an electric current to flow between the first potential line and the first node when a value of an electric current which flows through the first resistor is equal to or greater than a reference value.

3. The light receiving circuit according to claim 2, wherein the limiter circuit includes a second MOS transistor of a second conductivity type that is diode-connected.

4. The light receiving circuit according to claim 3, wherein an absolute value of a threshold voltage of the second MOS transistor is larger than an absolute value of a threshold voltage of the first MOS transistor.

5. The light receiving circuit according to claim 2, further comprising:
    a current extraction circuit connected between the first node and the second node, and configured to allow an electric current that corresponds to an electric current which flows through the limiter circuit, to flow between the first node and the second node.

6. The light receiving circuit according to claim 5, wherein the limiter circuit includes a second MOS transistor of a second conductivity type that is diode-connected, the second MOS transistor having a drain connected to the first potential line and a source connected to the first node, and
    the current extraction circuit includes a third MOS transistor of the second conductivity type having a drain connected to the second node, a source connected to the first node, and a gate connected to a gate of the second MOS transistor.

7. The light receiving circuit according to claim 2, wherein the limiter circuit includes a second MOS transistor of the first conductivity type that is diode-connected, the second MOS transistor having a source connected to the first potential line and a drain connected to the first node.

8. The light receiving circuit according to claim 7, further comprising:
a current extraction circuit connected between the first potential line and the second potential line and including a third MOS transistor of the first conductivity type, and fourth and fifth MOS transistors of a second conductivity type.

9. The light receiving circuit according to claim 8, wherein:
the third MOS transistor has a source connected to the first potential line and a gate connected to a gate of the second MOS transistor;
the fourth MOS transistor is diode-connected and has a drain connected to a drain of the third MOS transistor and a source connected to the second potential line; and
the fifth MOS transistor has a drain connected to the second node, a source connected to the second potential line, and a gate connected to a gate of the fourth MOS transistor.

10. The light receiving circuit according to claim 2, wherein
a power source voltage is applied to the first potential line,
a ground voltage is applied to the second potential line,
the first MOS transistor is a pMOS transistor, and
the photodiode has an anode connected to the second potential line and a cathode connected to the first node.

11. The light receiving circuit according to claim 1, wherein
a ground voltage is applied to the first potential line,
a power source voltage is applied to the second potential line,
the first MOS transistor is an nMOS transistor, and
the photodiode has a cathode connected to the second potential line and an anode connected to the first node.

12. The light receiving circuit according to claim 1, wherein at least one of the first resistor, the second resistor and the third resistor is formed of a depletion type MOS transistor.

13. A light receiving circuit comprising:
first and second terminals;
a first resistor and a photodiode connected in series between the first and second terminals;
a second resistor and a capacitor connected in parallel between the first terminal and a first node;
a first MOS transistor having a source connected to the first node, a drain connected to an output terminal, and a gate connected to a second node that is between the first resistor and the photodiode; and
a third resistor connected between the output and the second terminal.

14. The light receiving circuit according to claim 13, further comprising:
a limiter circuit including a second MOS transistor of a second conductivity type that is diode-connected, connected between the first terminal and the first node in parallel with the first resistor, and configured to allow an electric current to flow between the first terminal and the first node when a value of an electric current which flows through the first resistor is equal to or greater than a reference value.

15. The light receiving circuit according to claim 14, further comprising:
a current extraction circuit including a third MOS transistor of the second conductivity type, connected between the first node and the second node, and configured to allow an electric current that corresponds to an electric current which flows through the limiter circuit, to flow between the first node and the second node.

16. The light receiving circuit according to claim 13, further comprising:
a limiter circuit including a second MOS transistor of the first conductivity type that is diode-connected, the second MOS transistor having a source connected to the first potential line and a drain connected to the first node; and
a current extraction circuit connected between the first terminal and the second terminal and including a third MOS transistor of the first conductivity type, and fourth and fifth MOS transistors of a second conductivity type.

17. The light receiving circuit according to claim 13, wherein
a power source voltage is applied to the first terminal,
a ground voltage is applied to the second terminal,
the first MOS transistor is a pMOS transistor, and
the photodiode has an anode connected to the second potential line and a cathode connected to the first node.

18. The light receiving circuit according to claim 13, wherein
a ground voltage is applied to the first terminal,
a power source voltage is applied to the second terminal,
the first MOS transistor is an nMOS transistor, and
the photodiode has a cathode connected to the second potential line and an anode connected to the first node.

19. A light receiving circuit comprising:
first and second terminals;
a first resistor and a photodiode connected in series between the first and second terminals;
a second resistor and a capacitor connected in parallel between the first terminal and a first node;
a first MOS transistor having a source connected to the first node, a drain connected to an output terminal, and a gate connected to a second node that is between the first resistor and the photodiode; and
a third resistor connected between the output and the second terminal,
wherein an absolute value of a threshold voltage of the second MOS transistor is larger than an absolute value of a threshold voltage of the first MOS transistor.

20. The light receiving circuit according to claim 19, further comprising:
a limiter circuit including a second MOS transistor of a second conductivity type that is diode-connected, connected between the first terminal and the first node in parallel with the first resistor, and configured to allow an electric current to flow between the first terminal and the first node when a value of an electric current which flows through the first resistor is equal to or greater than a reference value; and
a current extraction circuit including a third MOS transistor of the second conductivity type, connected between the first node and the second node, and configured to allow an electric current that corresponds to an electric current which flows through the limiter circuit, to flow between the first node and the second node.

* * * * *